(12) United States Patent
    Kawamura et al.

(10) Patent No.: US 11,130,157 B2
(45) Date of Patent: Sep. 28, 2021

(54) OPTICAL UNIT FOR OPTICAL SORTER

(71) Applicant: SATAKE CORPORATION, Tokyo (JP)

(72) Inventors: Yoichi Kawamura, Tokyo (JP); Makoto Sakamoto, Tokyo (JP); Ryo Kakutani, Tokyo (JP)

(73) Assignee: Satake Corporation, Tokyo (JP)

( * ) Notice: Subject to any disclaimer, the term of this patent is extended or adjusted under 35 U.S.C. 154(b) by 182 days.

(21) Appl. No.: 16/469,981

(22) PCT Filed: Nov. 24, 2017

(86) PCT No.: PCT/JP2017/042276
§ 371 (c)(1),
(2) Date: Jun. 14, 2019

(87) PCT Pub. No.: WO2018/110252
PCT Pub. Date: Jun. 21, 2018

(65) Prior Publication Data
US 2020/0222946 A1    Jul. 16, 2020

(30) Foreign Application Priority Data
Dec. 15, 2016   (JP) .............................. JP2016-243339

(51) Int. Cl.
*B07C 5/36* (2006.01)
*G01N 21/85* (2006.01)
*B07C 5/342* (2006.01)
*G01N 21/89* (2006.01)

(52) U.S. Cl.
CPC ............ *B07C 5/3425* (2013.01); *B07C 5/362* (2013.01); *B07C 5/368* (2013.01); *G01N 21/85* (2013.01);
(Continued)

(58) Field of Classification Search
CPC ....... B07C 5/3425; B07C 5/362; B07C 5/368; G01N 21/85; G01N 21/89
(Continued)

(56) References Cited

U.S. PATENT DOCUMENTS 5,407,082 A * 4/1995 Childress ................ B07C 5/342
                                                        209/582
5,562,214 A * 10/1996 Castaneda ............. B07C 5/3425
                                                        209/564
(Continued)

FOREIGN PATENT DOCUMENTS

CN        1130104 A     9/1996
CN      104364022 A     2/2015
(Continued)

OTHER PUBLICATIONS

The Notification of the First Office Action dated Oct. 10, 2020 in Chinese Patent Application No. 201780076927.5 (7 pages) with an English translation (11) pages.

*Primary Examiner* — Terrell H Matthews
(74) *Attorney, Agent, or Firm* — Faegre Drinker Biddle & Reath LLP

(57) ABSTRACT

An optical unit for an optical sorter can simplify the assembling operation and the installing operation of the optical sorter through unifying components of an optical section of the optical sorter for sorting objects to be sorted such as a granular object or a sheet object. The optical unit includes an optical detection means for detecting the object to be sorted, an ejector means for ejecting the object to be sorted, a discrimination means for processing detection signal from the optical detection means to make a quality discrimination of the sorted objects, and an ejector driving means for driving the ejector means based on the quality discrimination of the discrimination means. The optical detection means, the ejector means, the discrimination means, and the
(Continued)

ejector driving means are integrated into a housing to unify them to provide the optical unit.

4 Claims, 8 Drawing Sheets

(52) U.S. Cl.
CPC ..... *G01N 21/89* (2013.01); *G01N 2021/8592* (2013.01); *G01N 2021/8909* (2013.01)

(58) Field of Classification Search
USPC .................................. 209/552, 576, 644, 938
See application file for complete search history.

(56) References Cited

U.S. PATENT DOCUMENTS 5,779,058 A    7/1998    Satake et al.

2015/0355016 A1    12/2015    Hasegawa et al.

FOREIGN PATENT DOCUMENTS

| | | | |
|---|---|---|---|
| CN | 205146723 U | | 4/2016 |
| CN | 106053342 A | | 10/2016 |
| EP | 2039438 A1 | | 3/2009 |
| JP | H10-30984 A | | 2/1998 |
| JP | H11-230911 A | | 8/1999 |
| JP | 2002-003924 | * | 3/2000 |
| JP | 2001-272353 A | | 10/2001 |
| JP | 2006-231233 A | | 9/2006 |
| JP | 2012250195 A | * | 3/2011 |
| JP | 2012-250193 A | | 12/2012 |
| JP | 2012-250195 A | | 12/2012 |
| JP | 2012250195 A | * | 12/2012 |
| JP | 2016-14657 A | | 1/2016 |

* cited by examiner

OPTICAL UNIT FOR OPTICAL SORTER

CROSS REFERENCE TO PRIOR APPLICATIONS

This application is the National Stage of International Application No. PCT/JP2017/042276 filed Nov. 24, 2017 and claims benefit of Japanese Application No. 2016-243339 filed Dec. 15, 2016, which are herein incorporated by reference in their entirety.

FIELD OF THE INVENTION

The present invention relates to an optical sorter for sorting particulate matter such as grains or resin pellets or sheet matter such as sheets of nori seaweed on the basis of color or the like, and to an optical unit for an optical sorter to be used as an optical section of the optical sorter.

BACKGROUND OF THE INVENTION

Conventionally, optical sorter for discriminating fed raw materials such as grains of rice, wheat, beans, nuts, etc., resin pieces such as pellets, beads, etc., fine particles such as medicines, ores, shirasu, etc., and other granular materials, sheet-like materials, etc., into non-defective and defective products based on colors, etc., and for removing foreign materials mixed in the raw materials, etc., are well known.

This type of optical sorter includes an optical section for sorting particulate matter and the like. The optical section includes an optical detection device for detecting particulate matter and the like, an ejector device for ejecting particulate matter and the like, a signal processing circuit for processing detection signal from the optical detection device to discriminate the quality of particulate matter and the like, and an ejector drive circuit for driving the ejector device based on the quality discrimination information obtained from the signal processing circuit.

The optical sorter disclosed in the Patent Document 1 includes anterior and posterior casings accommodating an optical detection devices such as illumination means and light receiving means. The casings are formed in an integral box body having a common side plate. The optical sorter further includes an air blowing device constituting an ejector device provided at a separation point on the downstream side of a transfer path from a measurement target region between casings.

However, in the optical sorter of the Patent Document 1, components of the optical section such as an air switching valve or a manifold constituting the ejector device, a signal processing circuit for processing signal from the light receiving means to discriminate the quality of particulate matter, and an ejector driving circuit for driving the ejector device based on the quality discrimination information obtained from the signal processing circuit are not provided integrally with the box body.

In other words, only the box body of the optical sorter does not provide a function of the optical section, so it is necessary to incorporate valves, a manifold, and each circuit board into the box body separately to complete the optical section, and then effect a coordination operation on it. Thus there remains a problem that the cumbersome assembling work and the installing work are required.

The optical sorter disclosed in the Patent Document 2 includes anterior and posterior casings accommodating an illumination means of an optical sorter respectively. The casings accommodating illumination means are connected with each other by means of side surface members located on both sides of the casings to form a single housing. Casings for accommodating light receiving units and the like constituting an optical detection device are connected and supported in both casings accommodating illumination means. Further, the optical sorter disclosed in Patent Document 2 includes an air blowing device, an air manifold, and solenoid valves constituting an ejector device attached to the housing in a condition in which the optical sorter is located on the downstream side in the transfer direction of the measurement target region between the two illumination unit storage cases. Both side portions of the housing are adapted to be supported by left and right side plates of base frame. A control device is housed within a space defined between the right side plate and a side cover attached thereto, and a solenoid valve drive circuit is housed within a space defined between the left side plate and a side cover attached thereto.

However, in the optical sorter disclosed in Patent Document 2 provided integrally with the housing are neither of a control device (signal processing circuit) for discriminating the quality of particulate matter or the like and a solenoid valve drive circuit (ejector drive circuit) for driving the ejector device based on the quality discrimination information of the control device.

Therefore, in the optical sorter disclosed in Patent Document 2, only the housing thereof does not provide a function as an optical section, so it is necessary to incorporate each circuit board to the machine body separately and then make an coordination operation on the optical part. Thus there remains a problem that the cumbersome assembling work and the installing work are required.

PRIOR ART DOCUMENTS

Patent Documents

[Patent document 1] Japanese Patent Application Laid-Open No. 2006-231233
[Patent document 2] Japanese Patent Application Laid-Open No. 2012-250193

SUMMARY OF THE INVENTION

Problem to be Solved by the Invention

It is therefore an object of the present invention to provide an optical unit for an optical sorter which can simplify an assembling operation and an installing operation of the optical sorter by unifying the optical section into one optical unit for sorting an object to be sorted such as a granular object or a sheet object.

Means of Solving the Problems

In order to achieve the above object, an optical unit for an optical sorter according to an embodiment of the present invention, comprising
optical detection means for detecting the objects to be sorted,
an ejector means for ejecting the sorted objects,
a discrimination means for processing detection signal from the optical detection means to make a quality discrimination of the sorted objects, and
an ejector driving means for driving the ejector means based on the quality discrimination of the determining means is provided.

The optical detection means, the ejector means, the discrimination means, and the ejector driving means are integrated into a housing of the unit to unify them to provide the optical unit.

Here, in the embodiment of the present invention, the discrimination on the quality of the sorted object performed by the discrimination means is not limited to the discrimination between the non-defective product and the defective product of the raw material, but includes the discrimination of the raw material, the discrimination of the foreign matter mixed in the raw material, the discrimination of the type of the raw material, and the like.

In the optical unit for the optical sorter according to the embodiment of the present invention, the optical detection means, the ejector means, the discrimination means, and the ejector driving means are integrated into the housing of the unit to unify them to provide the optical unit, so that the adjustment of the optical unit can be effected under the condition as it was unified as a single one.

Therefore, according to the optical unit for the optical sorter of the embodiment of the present invention, the adjustment of the optical section at the time of assembling or installing the optical sorter becomes unnecessary, and the assembling or installing operation of the optical sorter can be simplified.

The optical unit for the optical sorter according to the embodiment of the present invention, It is preferable that the housing includes at the central portion thereof a dropping space through which the objects to be sorted fallen, wherein a pair of said optical detection means are disposed anterior to and posterior to the dropping space, said ejector means is disposed in the anterior to or posterior to the dropping space, and said discrimination means and said ejector driving means are disposed in the side of the dropping space.

In the optical unit for the optical sorter according to an embodiment of the present invention, it is preferable that the housing comprises a pair of side frames located on both sides of the dropping space and connected with each other through shafts, a pair of cylindrical covers disposed between the side frames and anterior to and posterior to the dropping space, each cover is provided with a transparent plate on the side facing the dropping space, and a pair of side covers fixed to the outer ends of the side frames, wherein each of the optical detection means is disposed within the respective cylindrical covers, the ejector means is disposed in the dropping space at the front of any of the cylindrical covers, the discrimination means is disposed at any one of the spaces defined between the side frames and the side covers, and the ejector driving means is disposed at any other of the spaces between the side frames and the side covers.

In the optical unit for an optical sorter of the present invention, the optical detection means, the ejector means, the discrimination means, and the ejector driving means are integrated into the housing of the unit to unify them to provide the optical unit, so that various types of optical sorters can be easily configured by combining the unit for supplying the object to be sorted and the unit for discharging the object to be sorted after sorting.

In the optical unit for an optical sorter of the present invention, since the optical detection means, the ejector means, the discrimination means, and the ejector driving means are integrated into the housing of the unit to unify them to provide the optical unit, the optical unit can be functioned as an optical section only by being connected to a power source, an air source, or the like.

Therefore, according to the optical unit for an optical sorting machine of the present invention, it is possible to immediately discriminate the quality of the object and sort it by itself.

In the optical unit for an optical sorter of the present invention, the housing includes at the central portion thereof a dropping space through which the objects to be sorted fallen, wherein a pair of said optical detection means are disposed anterior to and posterior to the dropping space, said ejector means is disposed in the anterior to or posterior to the dropping space, and said discrimination means and said ejector driving means are disposed in the side of the dropping space. Thus an optical unit of compact configuration can be obtained.

Therefore, according to the optical unit for an optical sorter of the present invention, the assembling operation and the installing operation of the optical sorter can be facilitated.

In the optical unit for an optical sorter of the present invention incorporated into the housing thereof are a pair of side frames located on both sides of the dropping space and connected through shafts, a pair of cylindrical covers disposed between the side frames and positioned anterior to and posterior to the dropping space to which transparent plates are mounted on the side opposite to the dropping space, and a pair of side covers fixed to the outer ends of the side frames. The optical detection means is provided within the cylindrical covers. The ejector means is disposed within the dropping space in front of either cylindrical cover. The discrimination means is disposed within a space defined between one of the side frames and the side cover attached thereto, and the ejector driving means is disposed within a space between the other side frame and the side cover attached thereto. Thus a light-weight and compact configuration can be obtained.

An optical unit for an optical sorter according to an embodiment of the present invention, it is preferable that each cylindrical cover is formed of a metal-resin composite plate.

Further, the optical unit for an optical sorter of the present invention can be of a light-weight and rigid structure, provided the cylindrical cover is made of a metal-resin composite plate.

Thus the optical unit for an optical sorter of the present invention facilitates the assembling operation and the installing operation of the optical sorter.

An optical unit for an optical sorter according to an embodiment of the present invention is, preferably, the discrimination means comprises the signal processing circuit board, and the ejector driving means comprises the ejector driving circuit board.

Effect of the Invention

According to the present invention, it is possible to provide an optical unit for an optical sorter which can simplify the assembling operation and the installing operation of the optical sorter by unifying an optical section into one optical unit for sorting an object to be sorted such as a granular object or a sheet object.

DETAILED DESCRIPTION OF THE PREFERRED EMBODIMENTS

An embodiment of the present invention will now be described with reference to the attached drawings.

Figure 1:
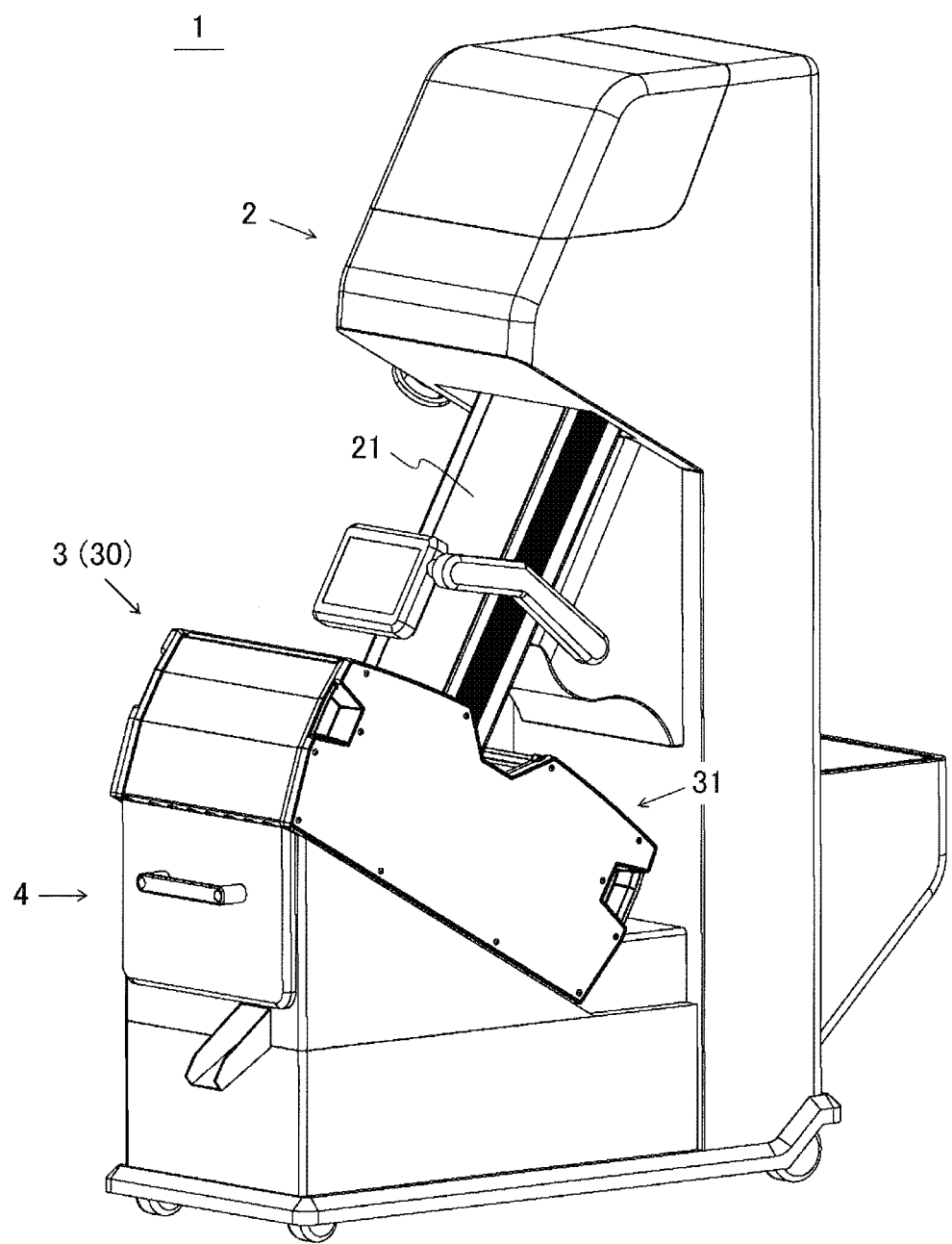
FIG. 1 is a perspective view of an optical sorter.

FIG. 1 is a perspective view showing an optical sorter using an optical unit of an embodiment of the present invention as an optical section.

The optical sorter 1 includes a particulate matter supply unit 2 for supplying particulate matter, an optical section 3 for sorting particulate matter, and a discharge unit 4 for discharging the sorted particulate matter.

The particulate matter supply unit 2 includes a raw material tank (not shown) and a chute 21 for supplying particulate matter in the raw material tank to the optical section 3.

The optical section 3 is, comprised of an optical unit 30 for sorting particulate matter supplied from the particulate matter supply unit 2. The optical unit 30 is adapted to be installed at a predetermined position of the optical sorter 1.

The discharge unit 4 includes discharge hoppers (not shown) for discharging the particulate matter sorted as defective or non-defective material by the optical section 3.

The optical unit 30 is formed by integrating within a housing 31 an optical detection device for detecting particulate matter, an ejector device for ejecting particulate matter, a signal processing circuit board for processing a detection signal from the optical detection device to discriminate the quality of particulate matter, and an ejector driving circuit board for driving the ejector device on the basis of the quality discrimination information obtained from the signal processing circuit board. Thus the optical section 3 is unified to provide the optical unit 30.

The quality discrimination of the particulate matter effected in the optical section 3 is not limited to the good or bad judgement on the quality of raw material supplied as the particulate matter, but includes the discrimination of the raw materials from the foreign matter mixed into the raw materials, the discrimination of the type of the raw materials, and the like.

In the particulate matter supply unit 2, the particulate matter fed out from the raw material tank flows down on the surface of the chute 21, and freely falls down along a predetermined trajectory from the lower end of the chute 21.

The free-falling particulate matter is detected by the optical detection device in the optical section 3, and the detection signal of the optical detection device is processed through the signal processing circuit board to discriminate whether it is good or not.

Then, the ejector device is driven by the ejector driving circuit board based on the result of the discrimination, and the defective particulate matter is excluded from the fall locus by the ejector device, and thus the quality discrimination is performed.

The particulate matter that has been subjected to the quality discrimination will then be discharged separately as defective or non-defective material from the discharge hoppers in the discharge section 4.

Figure 2:
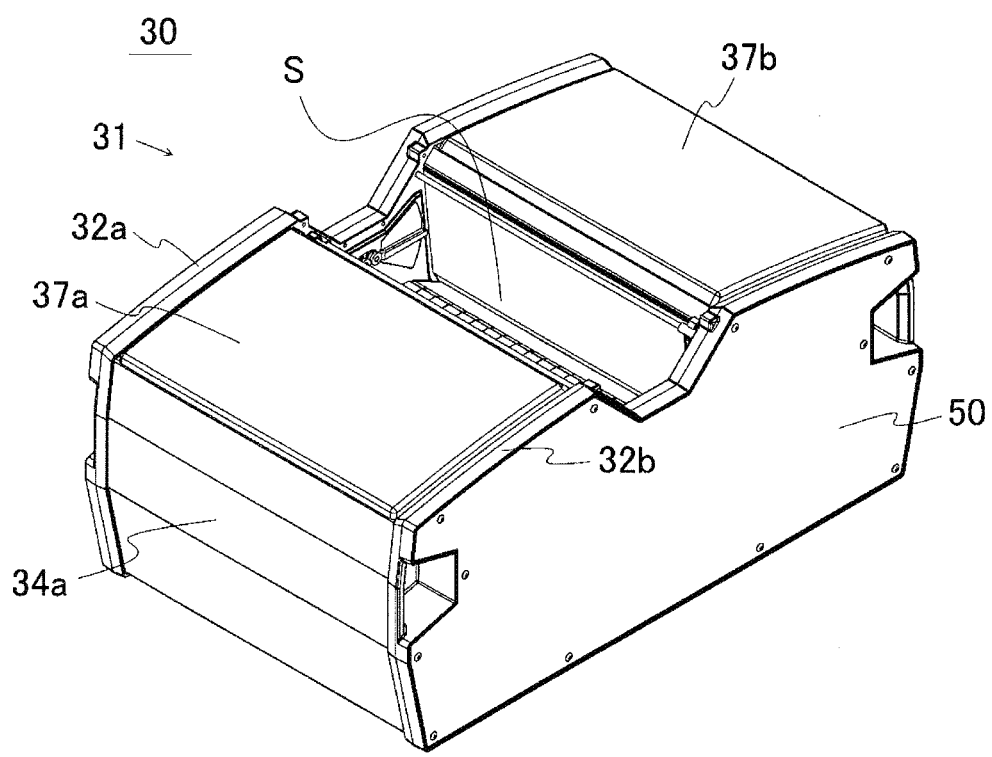
FIG. 2 is a perspective view of the optical unit.
Figure 3:
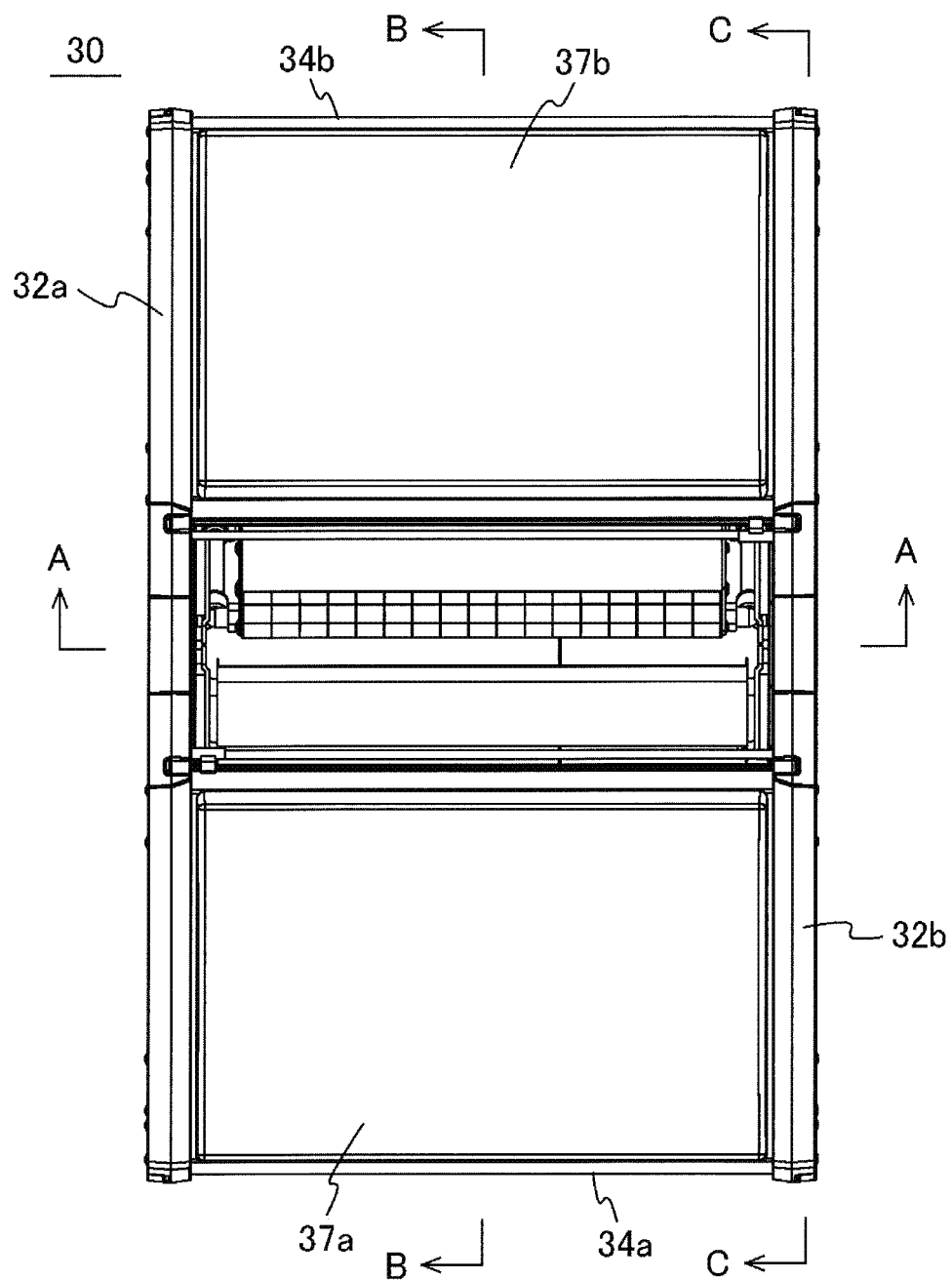
FIG. 3 is a plan view of the optical unit.

FIG. 2 shows a perspective view of the optical unit. FIG. 3 shows a plan view of the optical unit.

The optical unit 30 includes a housing 31 having a dropping space S at the center thereof through which particulate matter is thrown into the optical unit.

The housing 31 mainly includes side frames 32a and 32b, cylindrical covers 34a and 34b, top plates 37a and 37b, and side covers 50 and 50.

In the housing 31, integrally provided are a pair of anterior and posterior optical detection devices (not shown) disposed in front of and behind the dropping space S, an ejector device disposed in the dropping space S near the posterior device, and a signal processing circuit board and an ejector driving circuit board (not shown) disposed on the side of the dropping space S, respectively.

Figure 4:
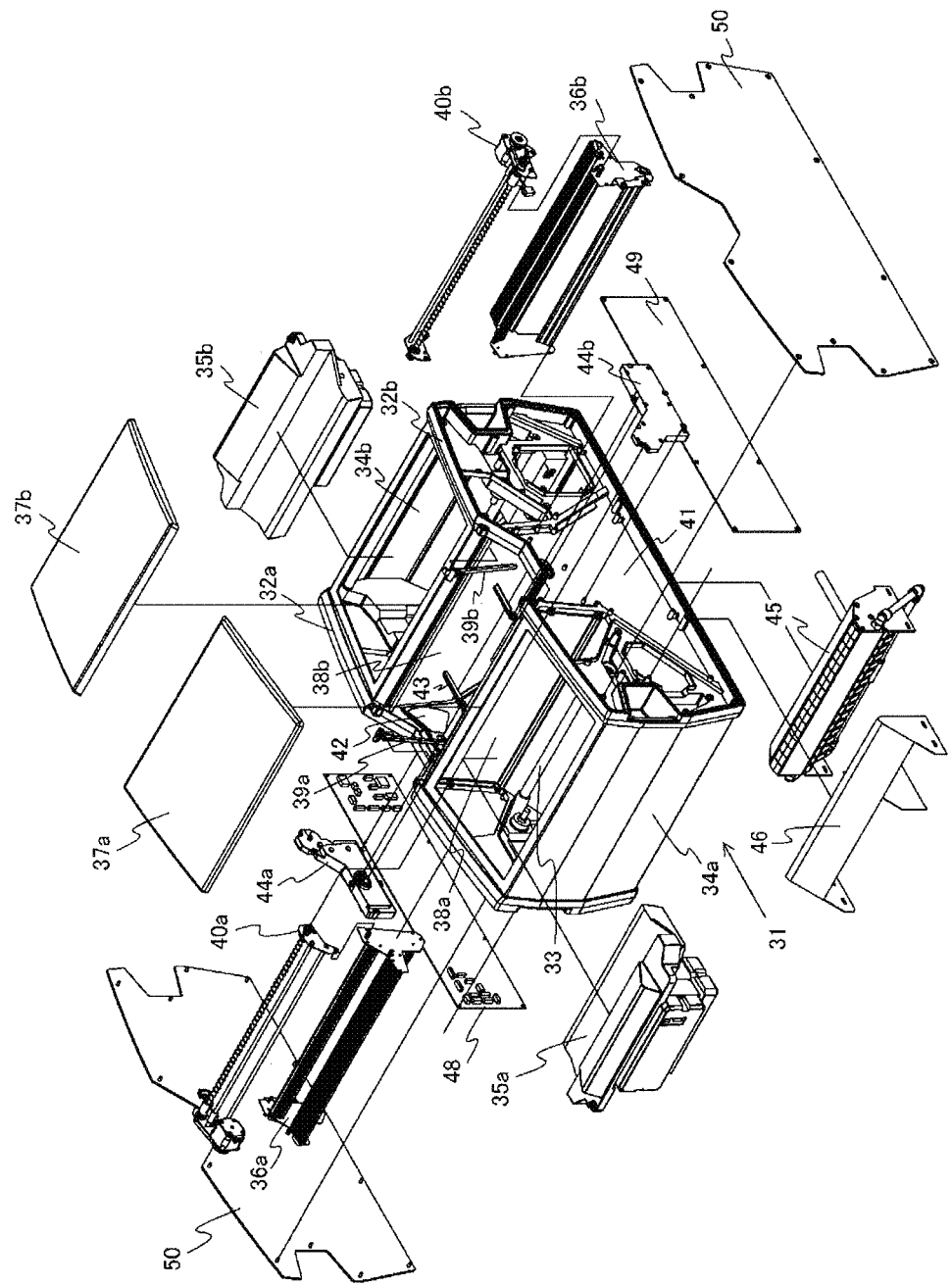
FIG. 4 is an exploded perspective view of the optical unit.
Figure 5:
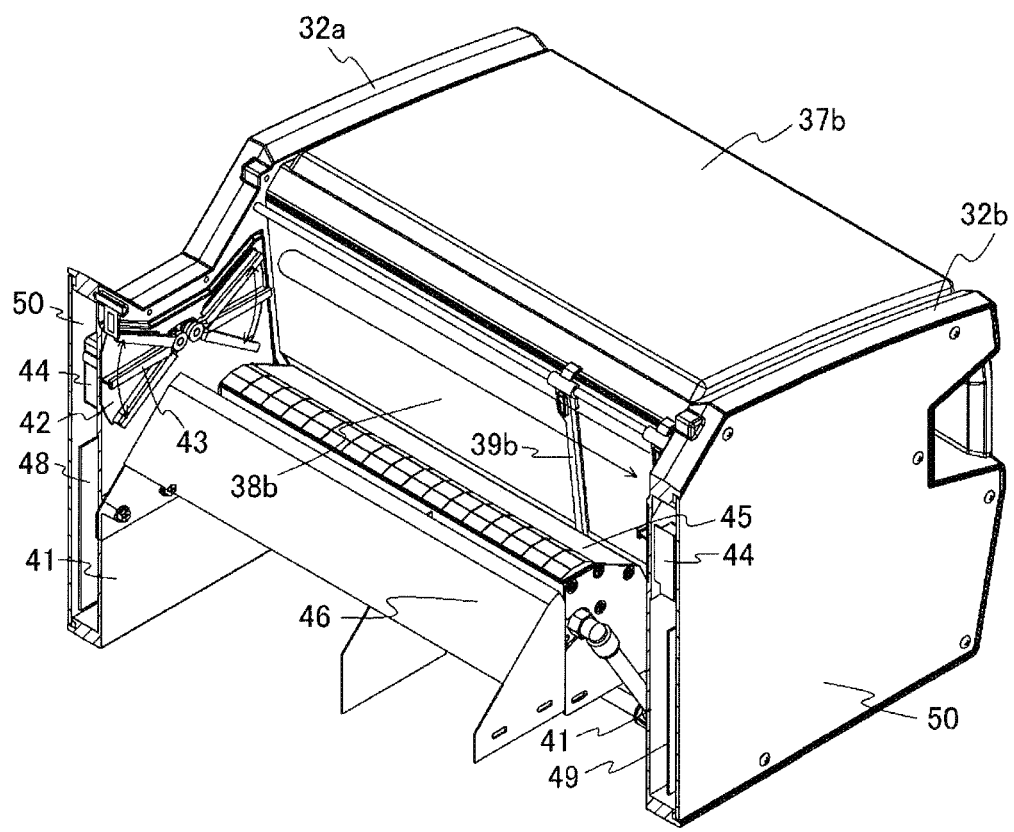
FIG. 5 is a cross-sectional perspective view of the optical unit illustrating the dropping space inside the optical unit.
Figure 6:
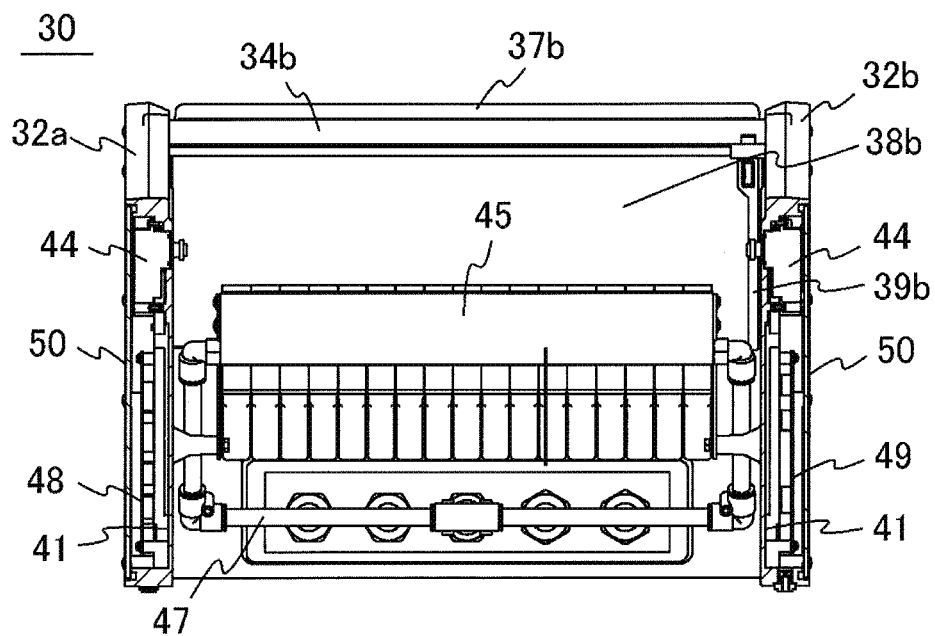
FIG. 6 is a cross-sectional view taken along line A-A of FIG. 3.
Figure 7:
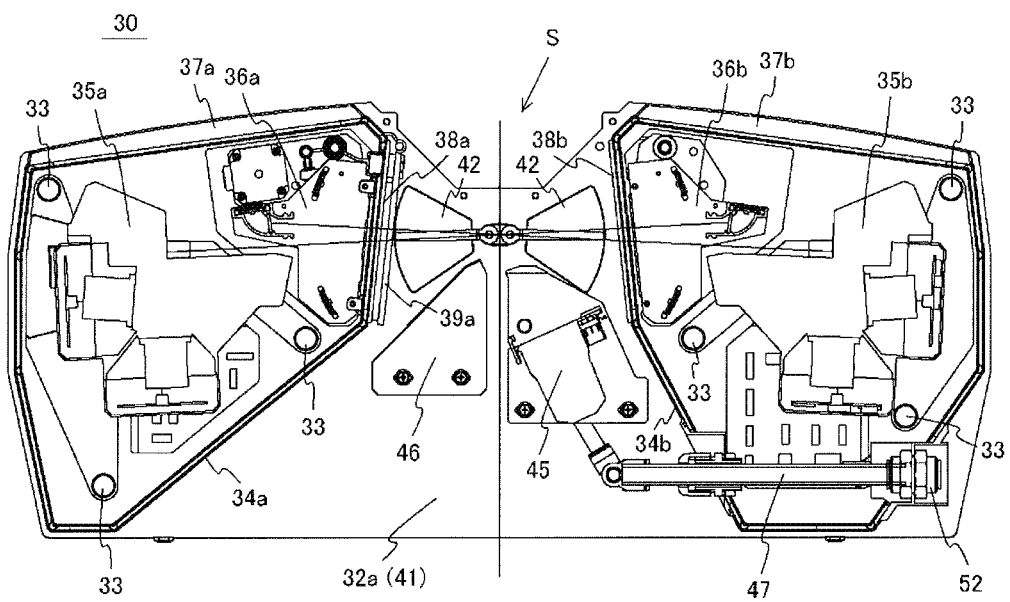
FIG. 7 is a cross-sectional view taken along line B-B of FIG. 3.
Figure 8:
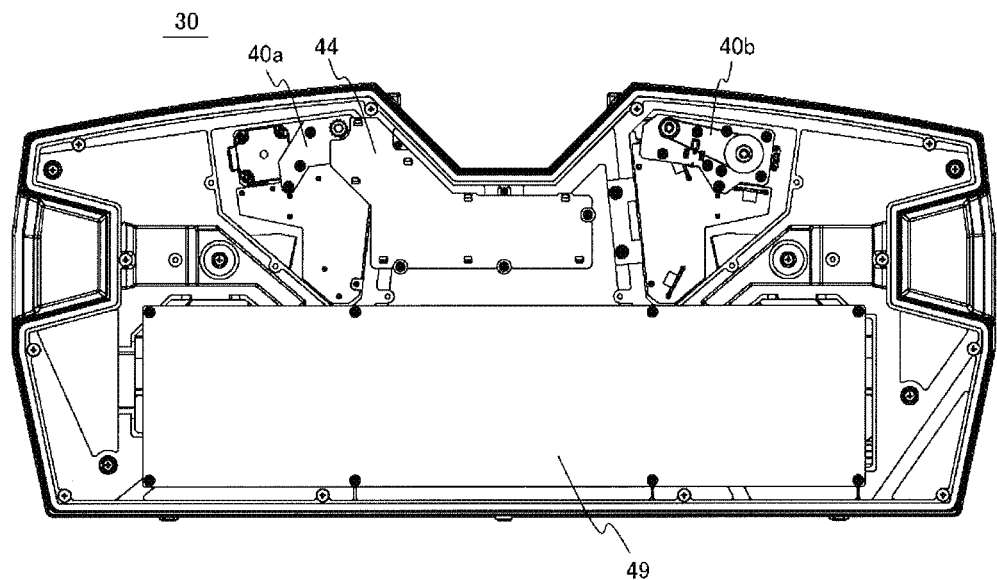
FIG. 8 is a cross-sectional view taken along line C-C of FIG. 3.

FIG. 4 shows an exploded perspective view of the optical unit. FIG. 5 is a cross-sectional perspective view of the optical unit illustrating the dropping space S inside the optical unit. FIG. 6 is a front cross-sectional view of the optical unit, showing a cross-sectional view taken along line A-A of FIG. 3. FIG. 7 is a side cross-sectional view of the optical unit, showing a cross-sectional view taken along line B-B of FIG. 3. FIG. 8 is a side cross-sectional view of the optical unit, showing a cross-sectional view taken along line C-C in FIG. 3.

The housing 31 has a pair of side frames 32a and 32b on both sides of the dropping space S, and the side frames 32a and 32b are connected with each other by means of a plurality of shafts 33 to form a framework of the optical unit.

A pair of cylindrical covers 34a and 34b of metal-resin composite plate formed by folding are disposed between the two side frames 32a and 32b and in front of and behind the dropping space S.

Components of the optical detection apparatus such as camera modules 35a and 35b and light source/background modules 36a and 36b are disposed inside the cylindrical covers 34a and 34b, respectively. The top portions of the cylindrical covers 34a, 34b are provided with apertures for disposing in the respective cylindrical covers 34a, 34b the camera modules 35a, 35b and the like, and the respective apertures are adapted to be closed by top plates 37a, 37b.

The side frames 32a and 32b are provided with openings for arranging the light source/background modules 36a and 36b and the like in the cylindrical covers 34a and 34b, and the openings are adapted to be closed by side covers 50 and 50.

Each of the cylindrical covers 34a and 34b is provided with a packing at a connection portion with other members, which is an opening portion, and a sealed space is defined therein.

A side of each cylindrical covers 34a and 34b opposite the dropping space S is provided with an aperture, and transparent glass plates 38a and 38b constituting the front wall and the rear wall of the dropping space S are attached to each aperture.

In addition, front wipers 39a and 39b are provided for cleaning the surfaces of the glass plates 38a and 38b facing the dropping space S. Front wiper modules 40a and 40b for operating the front wipers 39a and 39b are disposed inside the cylindrical covers 34a and 34b, respectively.

Instead of the glass plates 38a and 38b, a transparent plate made of another material may be mounted in the aperture provided on the side of each of the cylindrical covers 34a and 34b facing the dropping space S.

Each of the side frames 32a and 32b is provided integrally with end plates 41 and 41 constituting both side walls of the drop space S respectively, and a pair of mirrors 42 and 42 for securing the amount of light at both sides of the drop space S are mounted on the inner surface of the upper portion of the end plates 41 and 41 on the drop space S side.

Side wipers 43, 43 for cleaning are provided on the front surfaces of the mirrors 42, 42, and side wiper modules 44a, 44b for operating the side wipers 43, 43 are disposed outside the end plates 41, 41.

Instead of the mirrors 42, 42, a reflector made of another material may be mounted on the inner surface of each upper portion of the end plates 41, 41 on the dropping space S side.

A valve module 45 including nozzles, valves, and a manifold is disposed in the posterior side of the dropping space S on the rear side. A scattering prevention plate 46 is disposed on the anterior side of the dropping space S so as to face the valve module 45.

The valve module 45 constitutes the ejector device, and may be connected to an air pipe 47 disposed in the cylindrical cover 34b behind the dropping space S.

A signal processing circuit board 48 for processing the detected signal of the optical detection device to discriminate the quality of the particulate matter, and an ejector driving circuit board 49 for driving the ejector device based on the quality discrimination information of the signal processing circuit board 48 are disposed outside the end plates 41, 41 and below the side wiper modules 44a, 44b.

Side covers 50, 50 are provided over the signal processing circuit board 48 and the ejector driving circuit board 49 mounted on the side frames 32a, 32b.

Figure 9:
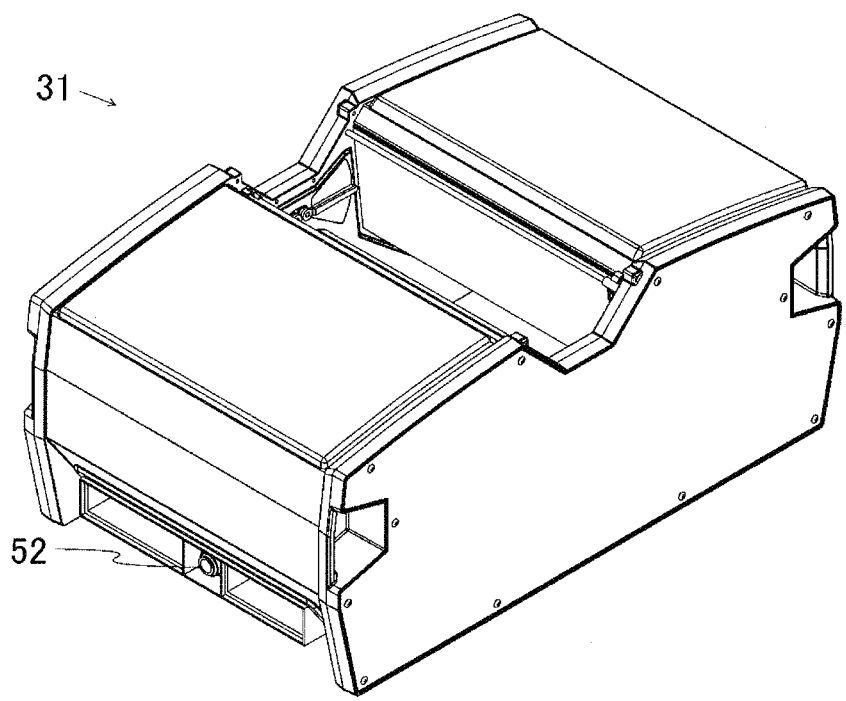
FIG. 9 is a rear perspective view of the optical unit.

FIG. 9 shows a rear perspective view of the optical unit.

Figure 10:
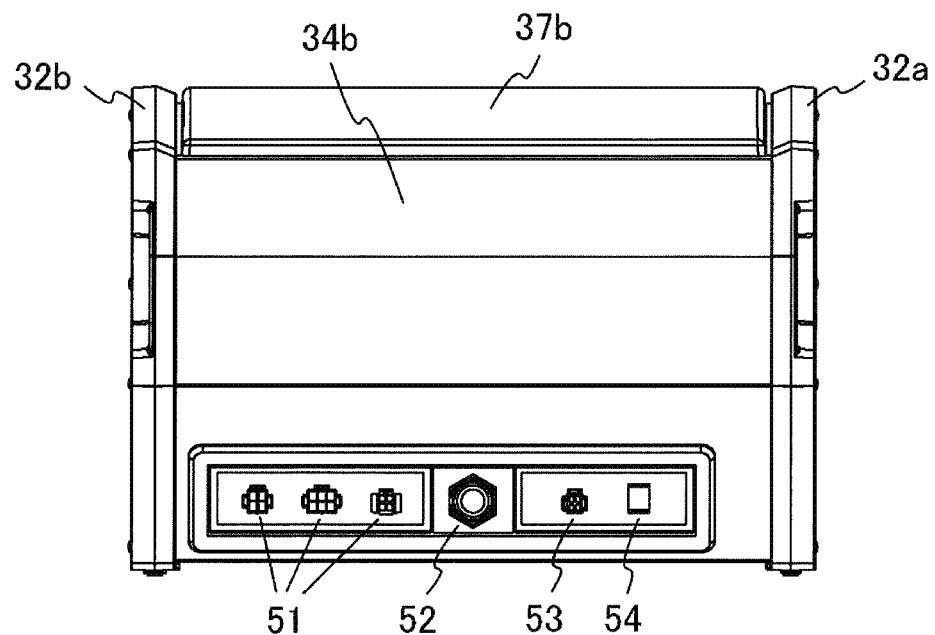
FIG. 10 is a rear view of the optical unit.

FIG. 10 shows a rear view of the optical unit.

The optical unit 30 includes various connectors such as a power supply connector 51, an air pipe connector 52, an I/O connector 53, and a network connector 54 on the rear surface side of the housing 31.

Air may be supplied from the air pipe connector 52 to the ejector device through the air pipe 47.

In addition, various wiring (not shown) is provided in the housing 31 so that electricity is supplied from the power connector 51 to the optical detection device, the ejector device, the signal processing circuit board, and the ejector driving circuit board, and a signal is transmitted through the I/O connector 52 and the network connector 53.

In the optical unit 30 according to the embodiment of the present invention, since the optical detection devices, the ejector device, the signal processing circuit board 48, and the ejector driving circuit board 49 are integrated together with the housing 31 to unify the optical unit for sorting the particulate matter, the adjustment of the optical unit can be effected under the condition as it was unified as a single one.

Therefore, in the optical unit 30 of the embodiment of the present invention, the adjustment of the optical sections at the time of assembling or installing the optical sorter becomes unnecessary, thus the assembling or installing operation of the optical sorter can be simplified.

In the optical unit 30 according to the embodiment of the present invention, since the optical detection devices, the ejector device, the signal processing circuit board 48, and the ejector driving circuit board 49 are integrated together with the housing 31 to unify the optical unit for sorting particulate matter, various types of optical sorters can be easily configured by combining them with a particulate matter supply unit and a sorted particulate matter discharge unit.

In the optical unit 30 in the embodiment of the present invention, since the optical detection devices, the ejector device, the signal processing circuit board 48 and the ejector driving circuit board 49 are integrated together with the housing 31 to form an optical unit for selecting particulate matter, it can be functioned as an optical unit 30 by being connected to a power source, an air source, or the like through the power connector 51 or the air pipe connector 52.

Therefore, in the optical unit 30 in accordance with the embodiment of the present invention, it is possible to immediately discriminate the quality of the particulate matter and to sort it by the optical unit in a single unit only.

In the optical unit 30 according to the embodiment of the present invention, the housing 31 is provided with the dropping space S for particulate matter through the central portion thereof. The optical unit 30 includes a pair of optical detection devices disposed anterior to and posterior to the dropping space S, the ejector device disposed in the dropping space S at the posterior side, and the signal processing circuit board 48 and the ejector driving circuit board 49 disposed at the side of the dropping space S, whereby a compact configuration can be obtained.

Therefore, in the optical unit 30 in accordance with the embodiment of the present invention, the assembling operation and the installing operation of the optical sorting machine can be facilitated.

The framework of the housing 31 of the optical unit 30 in the embodiment of the present invention is formed by a pair of side frames 32a and 32b disposed on both sides of the drop space S and connected by a plurality of shafts 33. A pair of cylindrical covers 34a and 34b formed by folding a metal-resin composite plate are disposed between the both side frames 32a and 32b and anterior to and posterior to the drop space S. Thus a light-weight and rigid structure can be obtained.

Therefore, according to the optical unit 30 in the embodiment of the present invention, the assembling operation and the installing operation of the optical sorting machine can be facilitated.

In the embodiment of the present invention described above, the ejector device is composed of the valve module 45 including the nozzles, the valves, and the manifold, and the ejection of the particulate matter with air is effected as exemplified above, but it may be effected by the mechanical operation.

Further, in the embodiment of the present invention described above, the optical unit is used as the optical section of the optical sorting machine for sorting particulate matter flowing down on the surface of the chute, but it can also be used as the optical unit of the optical sorting machine for sorting for example particulate matter, sheet-like matter, film-like matter and the like carried on the conveyor.

It is needless to say that the configuration of the optical unit 30 of the present invention is not limited to the above-described embodiment, and can appropriately be changed as long as it does not depart from the scope of the present invention.

INDUSTRIAL APPLICABILITY

The optical unit 30 of the present invention is extremely useful because the assembly work and the installation work of the optical sorter can be simplified by unifying the optical unit for sorting the object to be sorted, such as a granular object or a sheet object.

EXPLANATION OF REFERENCE NUMERALS 1 optical sorter
2 particulate matter supply unit
3 optical section
4 discharging unit
21 chute
30 optical unit
31 housing
32a, 32b side frame
33 shaft
34a and 34b cylindrical covers
35a, 35b camera module
36a, 36b light source and background module
37a, 37b top plate
38a and 38b glass plates (transparent plates)
39a and 39b front wipers
40a, 40b front wiper module
41 end-plate
42 mirror (reflector)
43 side wiper
44a, 44b side wiper module
45 valve module
46 anti-scatter plate
47 air piping
48 signal processing circuit board
49 ejector drive circuit board
50 side cover
51 power-supply connector
52 air piping connector
53 I/O connector
54 network connector
S dropping space

The invention claimed is:

1. An optical unit of an optical sorter for sorting objects to be sorted, comprising:
   an optical detector for detecting the objects to be sorted;
   an ejector for ejecting the sorted objects;
   a discrimination circuit for processing a detection signal from the optical detector to make a quality discrimination of the sorted objects; and
   an ejector driving circuit for driving the ejector based on the quality discrimination of the discrimination circuit, wherein the optical detector, the ejector, the discrimination circuit, and the ejector driving circuit are integrated into a housing of the unit to unify them to provide the optical unit,
   the housing includes at the central portion thereof a dropping space through which the objects to be sorted fall, wherein
   a pair of said optical detector are disposed anterior to and posterior to the dropping space, said ejector is disposed anterior to or posterior to the dropping space, and said discrimination circuit and said ejector driving circuit are disposed in the side of the dropping space, wherein
   the housing comprises
   a pair of side frames located on both sides of the dropping space and connected with each other through a plurality of shafts to form a framework;
   a pair of cylindrical covers disposed between the side frames and anterior to and posterior to the dropping space, each cover is provided with a transparent plate on the side facing the dropping space, and
   a pair of side covers fixed to the outer ends of the side frames, wherein
   each of the optical detector is disposed within the respective cylindrical covers,
   the ejector is disposed in the dropping space at the front of any of the cylindrical covers,
   the discrimination circuit is disposed at any one of the spaces defined between the side frames and the side covers, and
   the ejector driving circuit is disposed at any other of the spaces between the side frames and the side covers.

2. The optical unit for an optical sorter according to claim 1, wherein each cylindrical cover is formed of a metal-resin composite plate.

3. The optical unit for an optical sorter according to claim 1, wherein
   the discrimination circuit comprises the signal processing circuit board, and the ejector driving circuit comprises the ejector driving circuit board.

4. The optical unit for an optical sorter according to claim 2, wherein
   the discrimination circuit comprises the signal processing circuit board, and the ejector driving circuit comprises the ejector driving circuit board.

* * * * *